(12) United States Patent
Kim

(10) Patent No.: US 9,484,777 B2
(45) Date of Patent: Nov. 1, 2016

(54) ROTOR CORE OF MOTOR

(75) Inventor: Hyunseop Kim, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 96 days.

(21) Appl. No.: 13/552,280

(22) Filed: Jul. 18, 2012

(65) Prior Publication Data

US 2013/0038163 A1    Feb. 14, 2013

(30) Foreign Application Priority Data

Aug. 10, 2011   (KR) .................. 10-2011-0079538
Aug. 10, 2011   (KR) .................. 10-2011-0079539

(51) Int. Cl.
*H02K 1/27*       (2006.01)
*H02K 15/02*      (2006.01)
*H02K 15/03*      (2006.01)
*H02K 21/12*      (2006.01)
*H02K 1/28*       (2006.01)

(52) U.S. Cl.
CPC ............ *H02K 1/276* (2013.01); *H02K 15/028* (2013.01); *H02K 15/03* (2013.01); *H02K 1/27* (2013.01); *H02K 1/28* (2013.01); *H02K 21/12* (2013.01)

(58) Field of Classification Search
CPC ........ H02K 1/278; H02K 21/12; H02K 1/27; H02K 1/28; H02K 15/028; H02K 15/03
USPC .................. 310/156.53, 54, 56, 216.017
See application file for complete search history.

(56) References Cited

U.S. PATENT DOCUMENTS

| | | | | |
|---|---|---|---|---|
| 5,258,678 A | * | 11/1993 | Futami ..................... | 310/156.53 |
| 5,420,471 A | * | 5/1995 | Yun ....................... | H02K 19/16 |
| | | | | 310/191 |
| 5,786,650 A | * | 7/1998 | Uchida ................. | H02K 1/2773 |
| | | | | 310/156.55 |
| 5,864,191 A | * | 1/1999 | Nagate et al. .......... | 310/156.54 |
| 5,886,441 A | * | 3/1999 | Uchida ................. | H02K 1/2773 |
| | | | | 310/156.57 |
| 5,889,346 A | * | 3/1999 | Uchida ................. | H02K 1/2773 |
| | | | | 310/156.57 |
| 5,939,810 A | * | 8/1999 | Uchida ................. | H02K 1/2773 |
| | | | | 310/156.57 |
| RE36,367 E | * | 11/1999 | Nagate et al. ........... | 310/156.54 |

(Continued)

FOREIGN PATENT DOCUMENTS

| CN | 1037646 C | 3/1998 |
|---|---|---|
| CN | 1051654 C | 4/2000 |
| CN | 100541987 C | 9/2009 |

OTHER PUBLICATIONS

Office Action dated Nov. 26, 2015 in Chinese Application No. 201210285762.1.

*Primary Examiner* — Joshua Benitez Rosario
*Assistant Examiner* — Rashad Johnson
(74) *Attorney, Agent, or Firm* — Saliwanchik, Lloyd & Eisenschenk

(57) ABSTRACT

Provided is a rotor core of a motor, the rotor core, the rotor core including: a thin disk-shaped rotor core member; a shaft hole penetratively formed at a center of the rotor core member; a shaft press-fitted into the shaft hole; a plurality of magnet insertion holes penetratively formed at a position near to a periphery of the rotor core member for inserted coupling by a magnet; and a magnet support rotor core member in which a magnet support member tightly contacting a magnet inserted into the magnet insertion hole to a radial direction of the rotor core member is protrusively formed at the magnet insertion hole, wherein the rotor core members are stacked each at a predetermined height, and the magnet support rotor core members are arranged at an upper surface and a bottom surface of the plurality of stacked rotor core members, and the shaft is press-fitted into the shaft hole.

6 Claims, 6 Drawing Sheets

(56) References Cited

U.S. PATENT DOCUMENTS

| | | | |
|---|---|---|---|
| 6,376,956 B1* | 4/2002 | Hosoya | H02K 1/17 310/154.17 |
| 6,465,925 B2* | 10/2002 | Kako et al. | 310/156.16 |
| 6,774,523 B2* | 8/2004 | Ahn et al. | 310/216.023 |
| 6,853,112 B2* | 2/2005 | Nakamura | H02K 21/044 310/156.72 |
| 7,608,966 B2* | 10/2009 | Mizutani | H02K 1/276 310/156.53 |
| 7,642,691 B2* | 1/2010 | Morita | H02K 21/044 310/156.72 |
| 7,847,458 B2* | 12/2010 | Kim | H02K 1/276 310/156.16 |
| 8,232,703 B2* | 7/2012 | Nakayama et al. | 310/216.004 |
| 8,334,633 B2* | 12/2012 | Hazeyama | H02K 9/06 310/156.66 |
| 2004/0007930 A1* | 1/2004 | Asai | H02K 1/2746 310/156.53 |
| 2005/0040723 A1* | 2/2005 | Asai et al. | 310/156.53 |
| 2006/0158053 A1* | 7/2006 | Aschoff | H02K 1/2733 310/91 |
| 2007/0046125 A1* | 3/2007 | Torii et al. | 310/156.53 |
| 2009/0033167 A1* | 2/2009 | Bradfield | H02K 21/044 310/156.23 |
| 2009/0079285 A1* | 3/2009 | Koumura | H02K 21/044 310/156.16 |
| 2009/0108694 A1* | 4/2009 | Hanai | H02K 1/28 310/156.16 |
| 2010/0231078 A1* | 9/2010 | Taniguchi et al. | 310/156.21 |

* cited by examiner

ROTOR CORE OF MOTOR

CROSS-REFERENCE TO RELATED APPLICATIONS

This application claims the benefit under 35 U.S.C. §119 of Korean Patent Application Nos. 10-2011-0079538, filed Aug. 10, 2011 and 10-2011-0079539, filed Aug. 10, 2011, which are hereby incorporated by reference in their entirety.

BACKGROUND

1. Field of Invention

The present disclosure relates to a rotor core for a BLDC motor.

2. Background

This section provides background information related to the present disclosure which is not necessarily prior art.

In general, a rotor of a BLDC (Brushless direct current) motor is formed by press-fitting a shaft into a rotor core formed by being stacked with thin rotor core members. At this time, the rotor core member is arranged with magnet insertion holes, each at a predetermined gap, for inserting a magnet at a position near to a periphery.

Each shape of the magnet insertion hole is so arranged as to correspond to that of the magnet that is to be inserted, and each magnet generally takes an approximately trapezoidal shape to form pockets at both sides of the magnet insertion hole.

However, in a case the magnet insertion hole is formed with a shape a bit different from that of the magnet, the magnet may move or rotate inside the magnet insertion hole to generate a horizontal position scattering inside the rotor core, because of decreased adhesive force of an adhesive in long term use even if the magnet is secured by the adhesive.

In a case the horizontal position scattering by the position change is generated, a cogging torque becomes unstable due to inconsistent maintenance of magnetic force in the rotor to disadvantageously deteriorate a control characteristic of the rotor.

Furthermore, although the magnet is restricted in rotation by the centrifugal force generated by rotation of the rotor core, the magnet may be axially disengaged during rotation of the rotor core, because there is no separate support structure to an axial direction of the shaft rotatably supporting the rotor core.

In a case the magnet is rotated to the axial direction of the shaft, the magnetic force generated by the rotor core cannot be constantly maintained to deteriorate an operability of the motor and to make it difficult to perform an accurate control.

It is, therefore, desirable to overcome the above problems and others by providing an improved rotor core of a motor.

BRIEF SUMMARY

This section provides a general summary of the disclosure, and is not a comprehensive disclosure of its full scope or all of its features.

The present disclosure has been made to solve the foregoing problem(s) of the prior art, and therefore an object of certain embodiments of the present invention is to provide a rotor core of a motor improved in a shape of a magnet insertion hole, whereby an insertion/coupled position of a magnet can be constantly maintained.

Another object is to provide a structure-improved rotor core of a motor for inhibiting a mounted magnet from being disengaged to an axial direction of a shaft by rotation of the rotor core.

In one general aspect of the present disclosure, there is provided a stacked rotor core of a motor, the rotor core comprising: a thin disk-shaped rotor core member; a shaft hole penetratively formed at a center of the rotor core member; a shaft press-fitted into the shaft hole; a plurality of magnet insertion holes penetratively formed at a position near to a periphery of the rotor core member for inserted coupling by a magnet; and a magnet support rotor core member in which a magnet support member tightly contacting a magnet inserted into the magnet insertion hole to a radial direction of the rotor core member is protrusively formed at the magnet insertion hole, wherein the rotor core members are stacked each at a predetermined height, and the magnet support rotor core members are arranged at an upper surface and a bottom surface of the plurality of stacked rotor core members, and the shaft is press-fitted into the shaft hole.

Preferably, but not necessarily, the magnet insertion hole of the magnet support rotor core member is protrusively formed with a flange unit surface-contacting a wall surface of one side of the magnet and tightly contacting the magnet to a radial direction of the rotor core member.

Preferably, but not necessarily, a distal end of the flange unit is roundly bent.

Preferably, but not necessarily, the flange unit is formed with a with corresponding to that of the magnet, and a bent length of the flange unit is at least more than three times that of the rotor core member.

Preferably, but not necessarily, the flange unit is bent toward an insertion direction of the magnet.

Preferably, but not necessarily, one magnet support rotor core member is arranged at an uppermost place of the stacked rotor core members, and another magnet support rotor core member is arranged on a third rotor core member from a lowermost place of the stacked rotor core member.

Preferably, but not necessarily, the magnet takes a rectangular shape in a cross-section view thereof, and an adhesive is coated at a position surface-contacting the magnet insertion hole.

In another general aspect of the present disclosure, there is provided a rotor core of motor, the rotor core comprising: a thin disk-shaped rotor core member; a shaft hole penetratively formed at a center of the rotor core member; a shaft press-fitted into the shaft hole; a plurality of magnet insertion holes penetratively formed at a position near to a periphery of the rotor core member for inserted coupling by a magnet; and a plurality of magnet disengagement inhibition plates, each stacked at a predetermined height on an outermost periphery of the rotor core formed by insertion of the magnet into the magnet insertion hole.

Preferably, but not necessarily, the magnet disengagement inhibition plate is configured in the same manner as that of the rotor core member, and the magnet insertion hole provided at the magnet disengagement inhibition plate is inserted into the shaft to be dislocated from the magnet insertion hole of the stacked rotor core.

Preferably, but not necessarily, the magnet disengagement inhibition plate is brought into surface-contact with a first sheet of the rotor core member forming the rotor core and with a last sheet of the rotor core member forming the rotor core.

Preferably, but not necessarily, the magnet disengagement inhibition plate is press-fitted into the shaft such that at least two magnet insertion holes of the rotor core are exposed by the magnet insertion hole formed at the magnet disengagement inhibition plate.

Preferably, but not necessarily, eight magnet insertion holes are penetratively formed at a circumference of the rotor core member.

In still another general aspect of the present disclosure, there is provided a rotor core of motor, the rotor core comprising: a first rotor core stacked by a predetermined number of rotor core members and press-fitted into a first position; a second rotor core stacked by the same number of rotor core members as that of the first rotor core and press-fitted into a second position having a difference as much as a predetermined angle from the second position; and a third rotor core stacked by the same number of rotor core members as that of the first rotor core, and press-fitted in to a third position having a difference as much as a predetermined angle from the second position.

The rotor core of motor according to the present disclosure has an advantageous effect in that a pocket space is provided capable of inserting insulating paper as in the prior art, and a structure supporting a magnet to a direction of centrifugal force generated by rotation of rotor core is provided a rotor core member, whereby position scattering to horizontal and vertical directions of the magnet can be inhibited to provide an improved control characteristic of the motor through cogging torque stabilization.

Another advantage is that a magnet can be inhibited from being disengaged to an axial direction by only constituting a construction in which two sheets of plate-shaped rotor core members used for forming a rotor core are press-fitted into an uppermost surface and a lowermost surface of the rotor core.

Particular and preferred aspects of the present disclosure are set out in the accompanying independent and dependent claims. Features from the dependent claims may be combined with features of the independent claims and with features of other dependent claims as appropriate and not merely as explicitly set out in the claims.

Although there has been constant improvement, change and evolution of devices in this field, the present concepts are believed to represent substantial new and novel improvements, including departures from prior practices, resulting in the provision of more efficient, stable and reliable devices of this nature.

The above and other characteristics, features and advantages of the present disclosure will become apparent from the following detailed description, taken in conjunction with the accompanying drawings, which illustrate, by way of example, the principles of the invention.

This description is given for the sake of example only, without limiting the scope of the invention. The reference figures quoted below refer to the attached drawings.

BRIEF DESCRIPTION OF THE DRAWINGS

In order to explain the principle of the present disclosure, some accompanying drawings related to its preferred embodiments are below reported for the purpose of illustration, exemplification and description, although they are not intended to be exhaustive. The drawing figures depict one or more exemplary embodiments in accord with the present concepts, by way of example only, not by way of limitations. In the figures, like reference numerals refer to the same or similar elements.

Thus, a wide variety of potential practical and useful embodiments will be more readily understood through the following detailed description of certain exemplary embodiments, with reference to the accompanying exemplary drawings in which.

DETAILED DESCRIPTION

Figure 1:
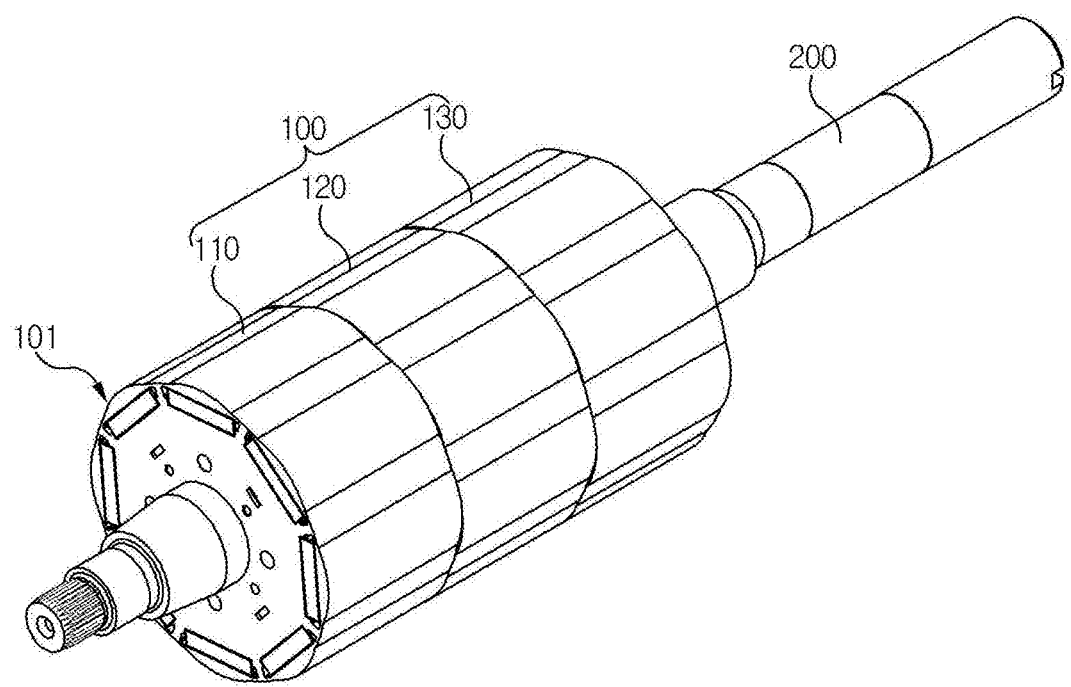
FIG. 1 is a schematic perspective view illustrating an assembled state of a rotor core according to a first exemplary embodiment of the present disclosure.

The disclosed embodiments and advantages thereof are best understood by referring to FIGS. 1-8 of the drawings, like numerals being used for like and corresponding parts of the various drawings. Other features and advantages of the disclosed embodiments will be or will become apparent to one of ordinary skill in the art upon examination of the following figures and detailed description. It is intended that all such additional features and advantages be included within the scope of the disclosed embodiments, and protected by the accompanying drawings. Further, the illustrated figures are only exemplary and not intended to assert or imply any limitation with regard to the environment, architecture, or process in which different embodiments may be implemented. Accordingly, the described aspect is intended to embrace all such alterations, modifications, and variations that fall within the scope and novel idea of the present invention.

Meanwhile, the terminology used herein is for the purpose of describing particular implementations only and is not intended to be limiting of the present disclosure. The terms "first", "second", and the like, herein do not denote any order, quantity, or importance, but rather are used to distinguish one element from another. For example, a second constituent element may be denoted as a first constituent element without departing from the scope and spirit of the present disclosure, and similarly, a first constituent element may be denoted as a second constituent element.

As used herein, the terms "a" and "an" herein do not denote a limitation of quantity, but rather denote the presence of at least one of the referenced item. That is, as used herein, the singular forms "a", "an" and "the" are intended to include the plural forms as well, unless the context clearly indicates otherwise.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present.

It will be further understood that the terms "comprises" and/or "comprising", or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Also, "exemplary" is merely meant to mean an example, rather than the best. If is also to be appreciated that features, layers and/or elements depicted herein are illustrated with particular dimensions and/or orientations relative to one another for purposes of simplicity and ease of understanding, and that the actual dimensions and/or orientations may differ substantially from that illustrated.

That is, in the drawings, the size and relative sizes of layers, regions and/or other elements may be exaggerated or reduced for clarity. Like numbers refer to like elements throughout and explanations that duplicate one another will be omitted. As may be used herein, the terms "substantially" and "approximately" provide an industry-accepted tolerance for its corresponding term and/or relativity between items.

Hereinafter, a rotor motor of motor according to the present disclosure will be described in detail with reference to the accompanying drawings.

Hereinafter, the present disclosure will be described based on an example of a BLDC motor among many motors, however, configuration of BLDC motor has nothing to do with the subject matter of the present disclosure, such that a detailed description of the BLDC motor will be omitted and a stacked rotor core of a motor, which is the characteristic configuration of the present disclosure, will be concentratively described.

Figure 2:
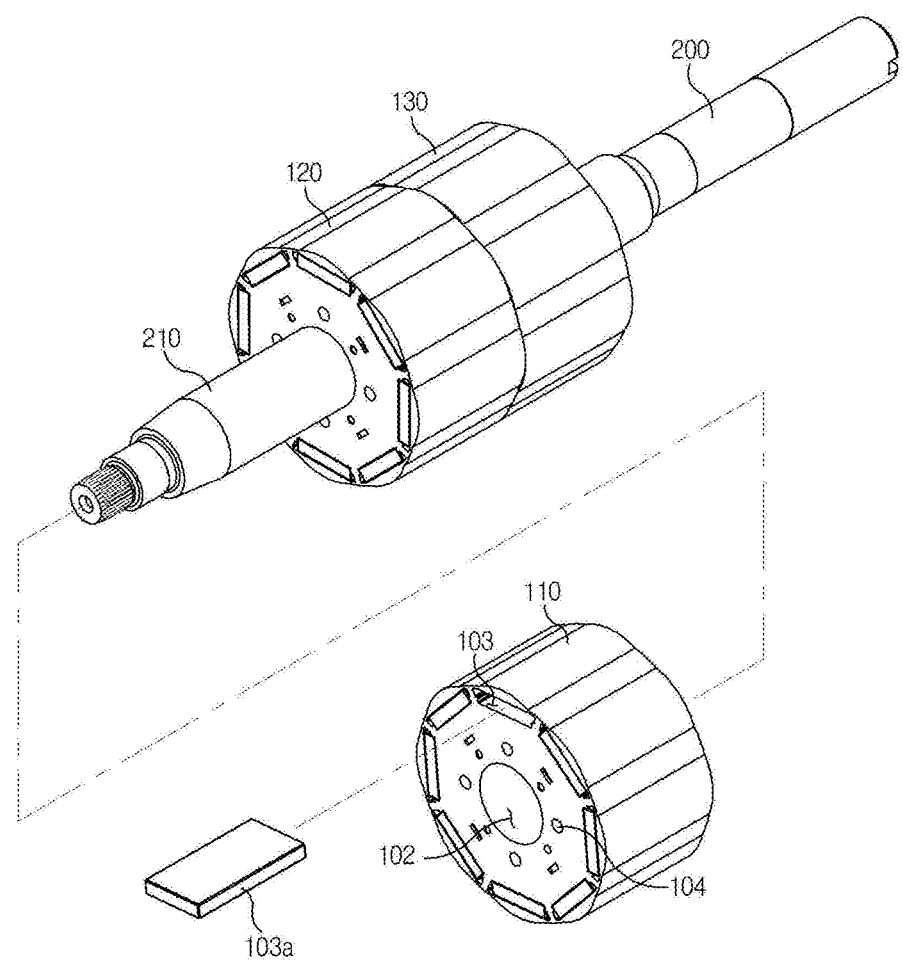
FIG. 2 is an exploded perspective view of FIG. 1.
Figure 3:
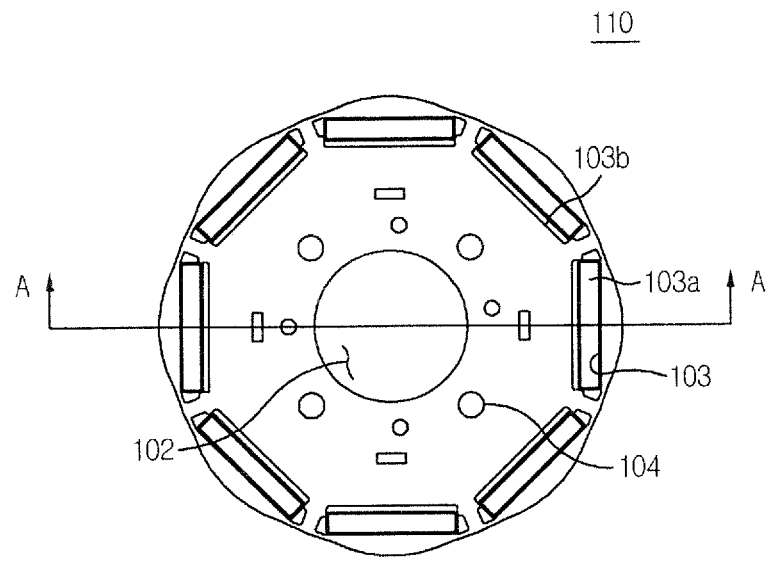
FIG. 3 is a plan view illustrating the rotor core of FIG. 1.
Figure 4:
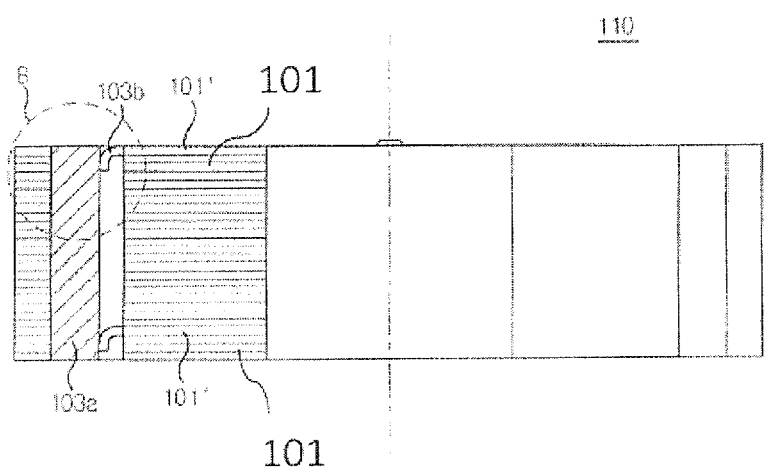
FIG. 4 is a cross-sectional view taken along line A-A of FIG. 3.
Figure 5:
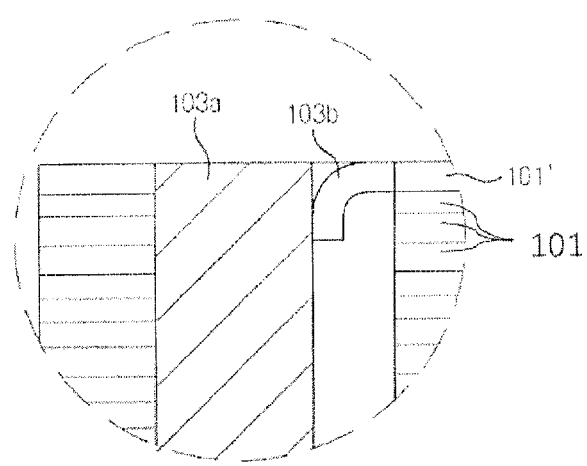
FIG. 5 is an enlarged view of 'B' section of FIG. 4.

FIG. 1 is a schematic perspective view illustrating an assembled state of a rotor core of BLDC motor according to a first exemplary embodiment of the present disclosure, FIG. 2 is an exploded perspective view of FIG. 1, FIG. 3 is a plan view illustrating the rotor core of FIG. 1, FIG. 4 is a cross-sectional view taken along line A-A of FIG. 3, and FIG. 5 is an enlarged view of 'B' section of FIG. 4.

Referring to FIGS. 1 and 2, a stacked rotor core of a motor includes a stacked rotor core (100) provided with a plurality of rotor core members (101) and a shaft (200).

The rotor core member (101) takes a shape of a thin iron plate with a thickness of approximately 0.5 mm. The rotor core member (101) is formed by punching a thin iron plate, and a plurality of rotor core members is stacked to form the rotor core (100).

Referring to FIG. 1, the rotor core (100) is formed with first, second and third rotor cores (110, 120, 130) stacked with the rotor core members (101) each at a same height and each at a predetermined angle of deviation, through which a shaft (200) is press-fitted.

A shaft hole (102) is formed at a center of the rotor core member (101) to allow the shaft (200) to pass therethrough. The shaft hole (102) is preferably formed with an approximately round shape.

A magnet insertion hole (103) is penetratively formed at a position near to a periphery of the rotor core member (101). The magnet insertion hole (103) is inserted and coupled by a magnet (103a) insertedly coupled to a direction parallel with a center shaft of the shaft hole (102). According to an exemplary embodiment of the present disclosure, the magnet (103a) is preferably formed with a cross-section of an approximate rectangle, and each of the magnets (103a) inserted into the magnet insertion hole (103) is preferably formed with a same size.

Preferably, a plurality of magnet insertion holes (103) is penetratively formed each at a predetermined interval, and according to an exemplary embodiment of the present disclosure, a total of eight (8) pieces of regular octagonal magnet insertion holes (103) is preferably formed along a periphery of the rotor core member (101).

Meanwhile, the number of magnet insertion holes (103) may increase or decrease depending on changed size of rotor core, in addition to the number of total of eight magnet insertion holes, such that the number of magnet insertion holes may include a regular pentagon (5 pieces), a regular hexagon (6 pieces) or more than eight (8) pieces of regular octagonal magnet insertion holes.

A fixing pin hole (104) is provided to allow a fixing pin (not shown) to be inserted therethrough, in a case each stacked rotor core member (101) is coupled by the fixing pin coupling each rotor core. The fixing pin hole (104) is preferably formed with a through hole having a diameter of approximately 2-3 mm. A plurality of fixing pin holes (104) is preferably formed, and as shown in the drawing, it is preferred that the plurality of fixing pin holes be diagonally formed. For example, as shown in FIG. 3, in a case where four fixing pin holes (104) are provided, each fixing pin hole is horizontally and vertically diagonal relative to a center of the shaft hole (102), such that imaginary extension lines connecting each facing fixing pin hole (104) are orthogonal.

A plurality of teeth (105) is protrusively formed at an inner circumferential surface of the shaft hole (102) each at a predetermined height toward the center of the shaft hole (102). A height of each tooth (015) may vary, but preferably the height of each tooth (015) is formed in the range of 1~2 mm.

The shaft (200) is press-fitted into the shaft hole (102) provided at the rotor core (100) to rotatably support the rotor core (100). The shaft (200) is formed with a rotor core accommodation unit (210) having a diameter corresponding to that of the shaft hole (102) as shown in FIG. 2. The rotor core accommodation unit (210) is performed with a surface smoothing treatment using mechanical means, e.g., knurling or skiving to inhibit the shaft (200) from idling inside the shaft hole (102). A distal end of one side of the shaft (200) is provided with a gear to transfer a power generated by rotation of the rotor core (100) to an outside. Configuration and operation of the shaft (200) have little relationship with the subject matter of the present disclosure, such that detailed description thereto is omitted.

Meanwhile, referring to FIGS. 4 and 5, it is preferably that the stacked rotor core according to an exemplary embodiment of the present disclosure be provided with at least two magnet support rotor core members (101'). At this time, a shape of the magnet support rotor core member (101') is same as that of the rotor core member (101) thus described, but there is a difference in that a flange unit (103b) is formed at an inner circumferential surface of the magnet insertion hole (103) for supporting the magnet (103a).

That is, as shown in FIGS. 4 and 5, the flange unit (103b) is formed at a surface near to the shaft hole (102) in the inner circumferential surface of the magnet insertion hole (103), and surface-contacts a surface of the magnet (103a) inserted into the magnet insertion hole (103). The flange unit (103b) is formed with a width same as that of a surface opposite to the magnet (103a), a distal end of which is bent, where a bent direction is an insertion direction of the magnet (103a).

Meanwhile, a length of the bent distal end of the flange unit (103b) is preferably at least three times the length of a thickness of the rotor core member (101). If the length of the flange unit (103b) is too short, the magnet (103b) cannot be fully pressed to a radial direction of the rotor core (110). However, because the flange unit (103b) is formed in the punching process of the magnet insertion hole (103), a longest length of the flange unit (103b) cannot exceed a length of radial direction of the magnet insertion hole (103).

Furthermore, according to an exemplary embodiment of the present disclosure, at least two pieces of magnet support rotor core members (101') is preferably used as shown in the cross-section of FIG. 4. Of course, although two or more magnet support rotor core members may be used, a sufficient pressing force may be obtained by support of the magnet (103a) from an upper side and a bottom side alone, as shown in FIG. 4.

At this time, the rotor core member (101) is stacked in such a manner that one magnet support rotor core member (101') is arranged at an uppermost place of the stacked rotor core members, and another magnet support rotor core member (101') is arranged on a third rotor core member from a lowermost place of the stacked rotor core member.

This structure is configured with an intention that the rotor core members (101) and the magnet support rotor core members (101') are stacked to allow the flange unit (103b) to be bent to an insertion direction of the magnet (103a) and to inhibit the flange unit (103b) from being exposed to an outside of the rotor core (110).

According to the above-mentioned structure, the magnet (103a) surface-contacts at a position near to a periphery of the magnet insertion hole (103), and fixed by an adhesive in a state of being surface-contacted to a surface near to an outside surface of the magnet insertion hole (103) which is a direction of centrifugal force generated when the rotor core (110) is rotated.

Furthermore, the magnet (103a) is pressed from a surface opposite to the adhered surface to a radial direction of the rotor core (110) by the flange unit (103b), whereby an initially adhered position is physically fixed. Thus, the magnet (103a) is not changed in position thereof even if the motor is used for a long term period or under adverse condition to weaken the adhesive force of the adhesive.

According to the construction thus described, in a case the magnet insertion hole (103) is inserted by the magnet (103a), other rotor core member (101) than the magnet support rotor core member (101') formed with the flange unit (103b) is formed with a sufficient void space to be used as a pocket, such that an insulation member including an insulating paper can be inserted into the void space, and a spacer can be insertedly coupled for inhibiting movement of the magnet (103a).

According to the present disclosure thus described, the magnet (103a) insertedly coupled to the rotor core (100) can be secured and coupled to a precise position of each of the magnet insertion holes (103), whereby, even if the rotor core (100) is used for a long term period, instability of cogging torque may be solved that may be generated when magnetic field of the rotor is changed in response to a so-called magnet scattering phenomenon that changes the position of the magnet (103a).

Although the foregoing has explained the BLDC motor, the description is not limited thereto, and the present disclosure may be applied to any other types of motors using a rotor.

Now, a stacked rotor core of a motor according to a second exemplary embodiment of the present disclosure will be described with reference to FIGS. 6, 7 and 8.

Figure 6:
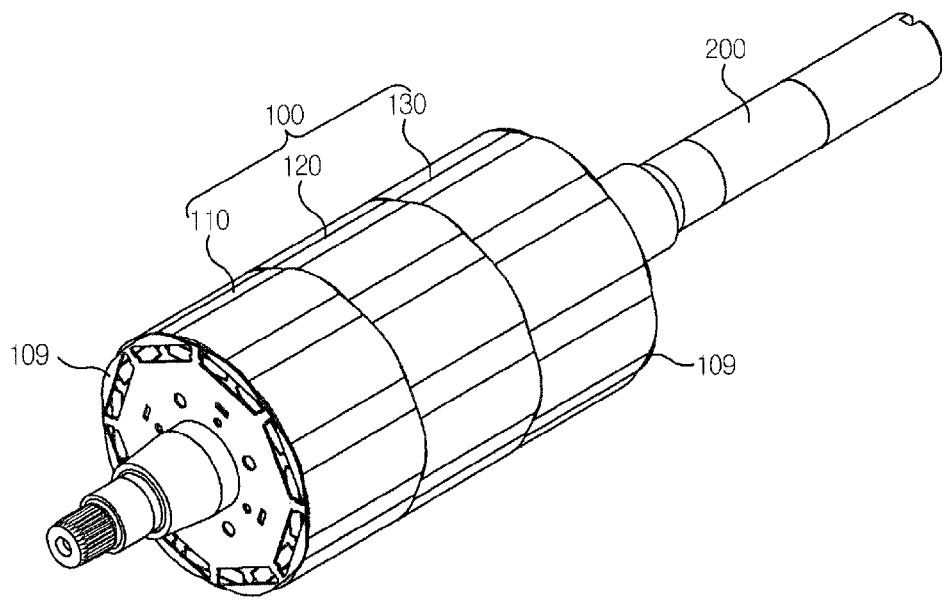
FIG. 6 is a schematic perspective view illustrating an assembled state of a rotor core according to a second exemplary embodiment of the present disclosure.
Figure 7:
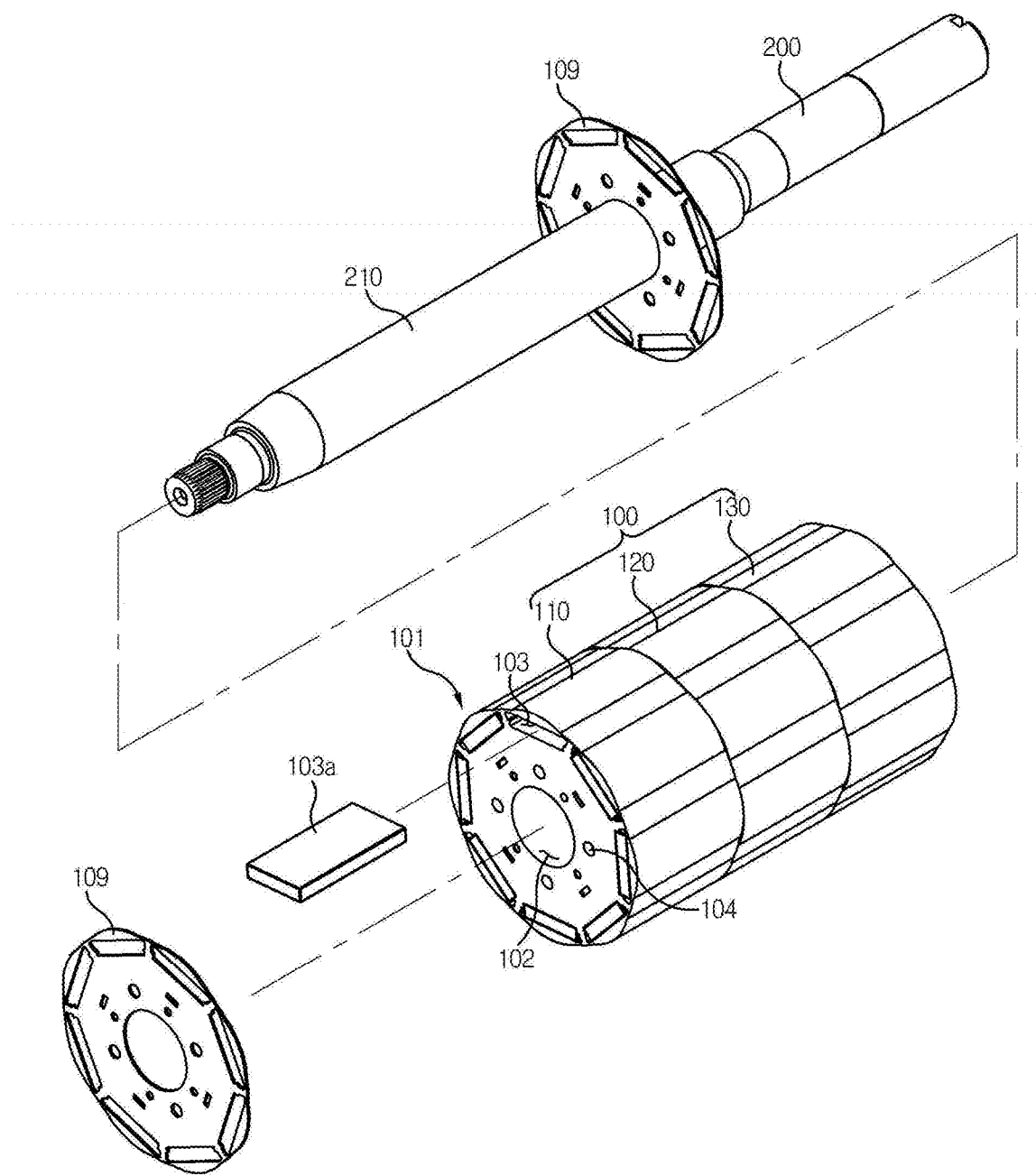
FIG. 7 is an exploded perspective view of FIG. 6.
Figure 8:
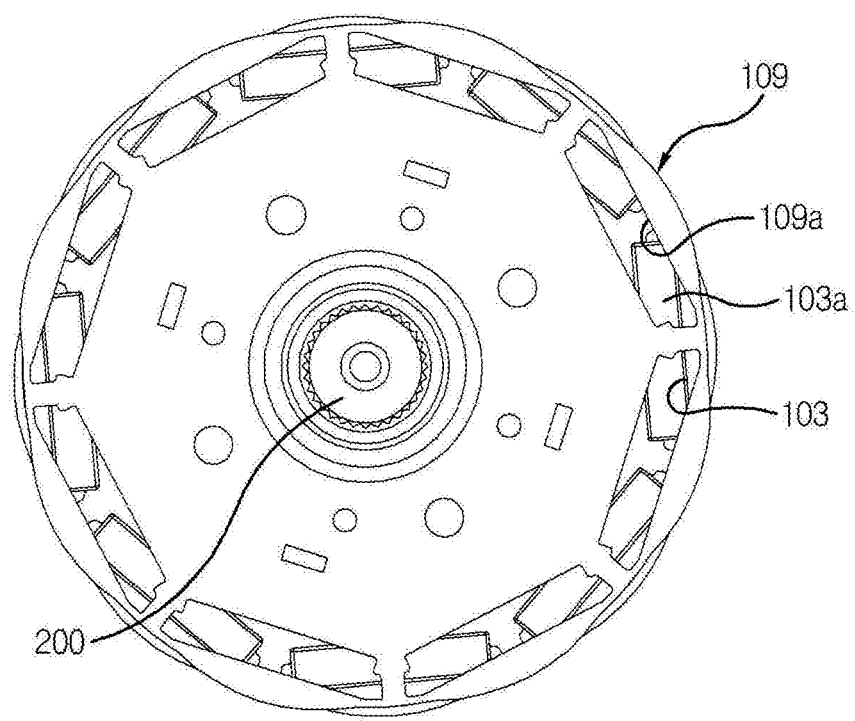
FIG. 8 is a front view of the rotor core of FIG. 6.

FIG. 6 is a schematic perspective view illustrating an assembled state of a rotor core according to a second exemplary embodiment of the present disclosure, FIG. 7 is an exploded perspective view of FIG. 6, and FIG. 8 is a front view of the rotor core of FIG. 6.

Referring to FIGS. 6 and 7, a stacked rotor core of a motor includes a rotor core (100) stacked by a plurality of rotor core members (101) and a shaft (200). The configuration of the rotor core (100), the rotor core member (101) and the shaft (200) has been already described in the first exemplary embodiment, such that no redundant explanation will be omitted.

Meanwhile, as illustrated in FIGS. 6, 7 and 8, a first, second and third rotor cores (110, 120, 130) are twistedly coupled to the shaft (200) at a predetermined angle, and each one sheet of magnet disengagement inhibition plate (109) is press-fitted into an uppermost surface and a lowermost surface of the rotor core (110). The magnet disengagement inhibition plate (109) may use the rotor core member (101) as it is, and it is preferred that the magnet disengagement inhibition plate (109) be press-fitted in a twisted state at a predetermined angle from the rotor core (110).

That is, as shown in FIG. 8, the magnet disengagement inhibition plate (109) takes the same shape as that of the rotor core member (101), and is formed with a same shape of a through hole (109a) as that of the magnet insertion hole (103). At this time, the through hole (109a) is preferably twisted at a predetermined angle from the magnet insertion hole (103) inserted coupled by the magnet (103a) in order to inhibit the magnet (103a) from being disengaged.

According to an exemplary embodiment of the present disclosure, a preferable arrangement is that the magnet insertion hole (103) and the through hole (109a) form an angle difference of 22.5 degrees in order for one through hole (109a) to inhibit two magnets (103a) from being disengaged. Although there is no problem in use if no parallel arrangement is made with the magnet insertion hole (103), a force generated by the disengaging magnet (103a) can be maximally and uniformly dispersed on the magnet disengagement inhibition plate (109) if the magnet disengagement inhibition plate (109) is mounted with an angle difference of 22.5 degrees, as mentioned above.

Although not shown in the figures, it may be possible that the magnet disengagement inhibition plate (109) is formed with only a disk member having a shaft hole that is press-fitted by the shaft (200), and with remaining parts being closed, and press-fitted into the shaft (200).

According to the present disclosure thus described, the existing rotor core member (101) is exclusively used as the magnet disengagement inhibition plate (109) for inhibiting the magnet (103a) from being disengaged, such that the firstly press-fitted sheet of rotor core member (101) and the lastly press-fitted sheet of rotor core member (101) are twistedly press-fitted to inhibit the mounted magnets (103a) from being disengaged to an axial direction without any additional manufacturing facilities.

Particularly, as illustrated in the figures, even if the plurality of rotor cores (110, 120, 130) is press-fitted into the shaft (200) per mode, and the shaft is press-fitted at a predetermined twisted angle among each mode, such that there is no need of inserting/mounting a separate magnet disengagement inhibition plate (109), and the magnet (103a) can be inhibited from being disengaged without any particular difficult, if only one sheet each at the outmost parts of front and rear surfaces, a total of two magnet disengagement inhibition plate (109), is press-fitted.

Although the foregoing has described and exemplified a BLDC motor, the present disclosure is not limited thereto, and other types of motors using rotors may be applied with the novel concept of the present disclosure.

As apparent from the foregoing, the present disclosure has an industrial applicability in that a pocket space is provided capable of inserting insulating paper as in the prior art, and a structure supporting a magnet to a direction of centrifugal force generated by rotation of rotor core is provided a rotor core member, whereby position scattering to horizontal and vertical directions of the magnet can be inhibited to provide an improved control characteristic of the motor through cogging torque stabilization, and a magnet can be inhibited from being disengaged to an axial direction by only constituting a construction in which two sheets of plate-shaped rotor core members used for forming a rotor core are press-fitted into an uppermost surface and a lowermost surface of the rotor core.

More particularly, various variations and modifications are possible in the component parts and/or arrangements of subject combination arrangement within the scope of the disclosure, the drawings and the appended claims. In addition to variations and modifications in the component parts and/or arrangements, alternative uses will also be apparent to those skilled in the art.

What is claimed is:

1. A stacked rotor core of a motor, the rotor core comprising:
    at least one magnet support rotor core member;
    a shaft hole penetratively formed at a center of the magnet support rotor core member;
    a shaft disposed within the shaft hole;
    a magnet insertion hole penetratively formed at the magnet support rotor core member and at a position spaced from the shaft hole;
    a magnet disposed within the magnet insertion hole; and
    a flange unit disposed on the magnet insertion hole,
    wherein the flange unit contacts a surface of the magnet,
    wherein the flange unit is outwardly extended from an inner surface of the magnet insertion hole and bent such that a distal end of the flange unit is parallel to an axial direction of the shaft,
    wherein the distal end of the flange unit is spaced apart from the inner surface of the magnet insertion hole such that a space is present between the distal end of the flange unit and the inner surface of the magnet insertion hole,
    wherein the stacked rotor core further comprises a plurality of rotor core members arranged with the magnet support rotor core member in a stack,
    wherein each rotor core member comprises a shaft hole penetratively formed at a center of the rotor core member and a plurality of magnet insertion holes each penetratively formed at a position near to a periphery of the rotor core member and configured to receive the magnet, and
    wherein a bent length of the flange unit is more than three times that of a rotor core member of the plurality of rotor core members.

2. The stacked rotor core of claim 1, wherein the distal end of the flange unit closest to the magnet is roundly bent.

3. The stacked rotor core of claim 1, wherein the flange unit is formed with a width corresponding to that of the magnet.

4. The stacked rotor core of claim 1, wherein the flange unit has a plate shape and is bent toward an insertion direction of the magnet.

5. The stacked rotor core of claim 1, wherein the magnet has a rectangular shape in a cross-sectional view thereof, and wherein an adhesive is coated at a position surface-contacting the magnet insertion hole.

6. The stacked rotor core of claim 1, wherein the flange unit comprises a plurality of flange units.

* * * * *